US011108345B1

United States Patent
Oborny et al.

(10) Patent No.: US 11,108,345 B1
(45) Date of Patent: Aug. 31, 2021

(54) CONTROL CIRCUIT FOR PASSIVE BRAKING FOR DC MOTOR

(71) Applicant: Texas Instruments Incorporated, Dallas, TX (US)

(72) Inventors: Nicholas James Oborny, Plano, TX (US); Ashish Ojha, Bangalore (IN); Priyank Anand, Bangalore (IN); Clark Douglas Kinnaird, Richardson, TX (US); Chinmay Jain, Bangalore (IN); Arun Tej Vemuri, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/828,757

(22) Filed: Mar. 24, 2020

(51) Int. Cl.
*H02P 3/10* (2006.01)
*H02P 6/08* (2016.01)
*H02P 7/28* (2016.01)
*H02P 7/06* (2006.01)

(52) U.S. Cl.
CPC .............. *H02P 3/10* (2013.01); *H02P 6/085* (2013.01); *H02P 7/063* (2013.01); *H02P 7/28* (2013.01)

(58) Field of Classification Search
None
See application file for complete search history.

(56) References Cited

U.S. PATENT DOCUMENTS

| | | | |
|---|---|---|---|
| 4,581,565 A * | 4/1986 | Van Pelt | H02P 7/04 318/294 |
| 2003/0164545 A1 * | 9/2003 | Nadd | H02H 7/0838 257/724 |
| 2003/0165072 A1 * | 9/2003 | Nadd | H02M 7/003 363/147 |
| 2004/0189229 A1 * | 9/2004 | Nadd | H02H 7/0838 318/434 |

* cited by examiner

Primary Examiner — Bentsu Ro
(74) Attorney, Agent, or Firm — Mark Allen Valetti; Charles A. Brill; Frank D. Cimino (57) ABSTRACT

A control circuit includes a first high-side transistor coupled between a voltage supply terminal and the first terminal of a DC motor and a second high-side transistor coupled between the voltage supply terminal and the second terminal of the DC motor. The control circuit includes a first low-side transistor coupled between a ground terminal and the first terminal of the DC motor and a second low-side transistor coupled between the ground terminal and the second terminal of the DC motor. The control circuit includes a first pull-up resistor coupled between the voltage supply terminal and a gate terminal of the first low-side transistor and a second pull-up resistor coupled between the voltage supply terminal and a gate terminal of the second low-side transistor. The pull-up resistors apply bias currents to turn ON the first and second low-side transistors to provide a conductive path to brake the DC motor.

30 Claims, 4 Drawing Sheets

FIG. 4

CONTROL CIRCUIT FOR PASSIVE BRAKING FOR DC MOTOR

BACKGROUND

The disclosure generally relates to control circuits for passive braking for DC motors.

DESCRIPTION OF THE RELATED ART

DC motors are used in various systems that often require passive braking. For example, automotive closure systems (e.g., rear lift-gate, sunroof, window lift) need passive braking to hold a DC motor stationary while a vehicle is dormant to prevent the motor from generating a significant voltage due to back electromotive force (EMF) in the event the motor is externally driven. A motor would be externally driven if it is rotated using an external force which may be applied manually when the motor is powered OFF. For example, for a motor used to open and close a car lift gate, the motor would be externally driven when a person manually closes the lift gate. Also, these closure systems require passive braking to prevent tampering or forced entry into a vehicle through the lift gate or the sunroof.

Existing braking systems often use mechanical switches such as relays to create a short circuit across terminals of the DC motor when the motor is driven externally. When the DC motor is driven externally, the motor acts as a generator and develops a voltage across its terminals. The short circuit is applied across the terminals to brake the motor/generator. The mechanical switches, however, have drawbacks. The mechanical switches do not change position instantaneously, and thus do not respond instantaneously. Also, the mechanical switches exhibit contact bounce, and as a result are unable to provide a continuous short circuit (i.e., zero ohms resistance) across the terminals of the DC motor.

In solid-state motor drives having transistor bridges (e.g., MOSFET bridge), mechanical switches such as relays are replaced with transistors. When the DC motor is powered-off and the motor drive enters a deep sleep state, the transistors (e.g., MOSFETs) do not provide a conductive path. Thus, solid-state motor drives do not provide passive braking, increasing the likelihood of unintended motor rotation. Furthermore, in many solid-state motor drives, it is not feasible to always actively control the MOSFETs to brake the DC motor, specifically when the solid-state drives enter a deep sleep state.

SUMMARY

Various aspects of the present disclosure are directed to a control circuit for a DC motor. In one aspect, the control circuit includes a first high-side transistor coupled between a voltage supply terminal and a first terminal of the DC motor and a second high-side transistor coupled between the voltage supply terminal and a second terminal of the DC motor. The control circuit further includes a first low-side transistor coupled between a ground terminal and the first terminal of the DC motor and a second low-side transistor coupled between the ground terminal and the second terminal of the DC motor. The control circuit also includes a first pull-up resistor coupled between the voltage supply terminal and a gate terminal of the first low-side transistor and a second pull-up resistor coupled between the voltage supply terminal and a gate terminal of the second low-side transistor. The first and second pull-up resistors apply respective bias currents to turn ON the first and second low-side transistors to provide a conductive path across the first and second terminals of the DC motor to brake the DC motor.

In an additional aspect of the disclosure, the first high-side and the second low-side transistors are turned ON to rotate the DC motor in a clockwise direction, while the second high-side and the first low-side transistors are turned ON to rotate the DC motor in a counter-clockwise direction. The first and second high-side transistors are turned OFF when the DC motor is disconnected from a voltage supply.

In an additional aspect of the disclosure, the first and second low-side transistors are turned ON by the respective bias currents to provide a short circuit path across the first and second terminals of the DC motor when the DC motor is externally driven.

In an additional aspect of the disclosure, a first low-side transconductor is coupled between the gate terminal of the first low-side transistor and the ground terminal to sink current from the first pull-up resistor when the first low-side transistor is turned OFF, and a second low-side transconductor coupled is between the gate terminal of the second low-side transistor and the ground terminal to sink current from the second pull-up resistor when the second low-side transistor is turned OFF.

In an additional aspect of the disclosure, a control circuit for a DC motor includes first and second high-side transistors and first and second low-side transistors coupled to the DC motor in a bridge configuration. The first high-side transistor and the second low-side transistor are turned ON to rotate the DC motor in a clockwise direction, while the second high-side transistor and the first low-side transistor are turned ON to rotate the DC motor in a counter-clockwise direction. The control circuit also includes a first pull-up resistor coupled between a voltage supply terminal and a gate terminal of the first low-side transistor and a second pull-up resistor coupled between the voltage supply terminal and a gate terminal of the second low-side transistor. The first and second pull-up resistors apply respective bias currents to turn ON the first and second low-side transistors to provide a conductive path across the first and second terminals of the DC motor to brake the DC motor.

In an additional aspect of the disclosure, a control circuit for a DC motor includes a first high-side transistor coupled between a voltage supply terminal and a first terminal of the DC motor and a second high-side transistor coupled between the voltage supply terminal and a second terminal of the DC motor. The control circuit also includes a first low-side transistor coupled between a ground terminal and the first terminal of the DC motor and a second low-side transistor coupled between the ground terminal and the second terminal of the DC motor. The control circuit also includes fifth and sixth transistors coupled in series across the first and second terminals of the DC motor. The fifth and the sixth transistors are turned OFF when the DC motor is powered ON, and the fifth and the sixth transistors are turned ON when the DC motor is disconnected from a voltage supply to provide a conductive path across the first and second terminals of the DC motor to brake the DC motor. The control circuit also includes a seventh transistor coupled to the fifth and sixth transistors to turn OFF the fifth and sixth transistors when the DC motor is powered ON and to turn ON the fifth and sixth transistors when the DC motor is disconnected from the voltage supply. The control circuit also includes a first pull-up resistor coupled between the voltage supply terminal and the gate terminals of the fifth and sixth transistors. The first pull-up resistor is configured to turn ON the fifth and sixth transistors when the seventh transistor is turned OFF. The control circuit also includes a first pull-down resistor coupled between the ground terminal and the first terminal of the DC motor.

In an additional aspect of the disclosure, a control circuit for a DC motor includes first and second high-side transistors and first and second low-side transistors coupled to the DC motor in a bridge configuration. The first high-side transistor and the second low-side transistor are turned ON to rotate the DC motor in a clockwise direction while the second high-side transistor and the first low-side transistor are turned ON to rotate the DC motor in a counter-clockwise direction. The control circuit also includes fifth and sixth transistors coupled in series across first and second terminals of the DC motor. The fifth and the sixth transistors are turned OFF when the DC motor is powered ON, and the fifth and the sixth transistors are turned ON when the DC motor is disconnected from a voltage supply to provide a conductive path across the first and second terminals of the DC motor to brake the DC motor. The control circuit also includes a seventh transistor coupled to the fifth and sixth transistors to turn OFF the fifth and sixth transistors when the DC motor is powered ON and configured to turn ON the fifth and sixth transistors when the DC motor is disconnected from the voltage supply. The control circuit also includes a first pull-up resistor coupled between the voltage supply terminal and the gate terminals of the fifth and sixth transistors. The first pull-up resistor is configured to turn ON the fifth and sixth transistors when the seventh transistor is turned OFF.

In an additional aspect of the disclosure, a control circuit includes a high-side NMOS transistor coupled between a voltage supply terminal and a first terminal of a DC motor and a second high-side NMOS transistor coupled between the voltage supply terminal and a second terminal of the DC motor. The control circuit also includes a first low-side NMOS transistor coupled between a ground terminal and the first terminal of the DC motor and a second low-side NMOS transistor coupled between a ground terminal and the second terminal of the DC motor. The control circuit also includes first and second PMOS transistors coupled in series across the first and second terminals of the DC motor. The control circuit also includes a charge pump coupled to gate terminals of the fifth and sixth PMOS transistors. The control circuit also includes a pull-down resistor coupled between the first terminal of the DC motor and the ground terminal. When the DC motor is powered ON, the charge pump applies a charge to the gate terminals of the PMOS transistors to turn OFF the PMOS transistors, and when the DC motor is disconnected from a voltage supply, the charge pump turns ON the PMOS transistors to provide a conductive path across the terminals of the DC motor.

In an additional aspect of the disclosure, an automotive electronic system is operable to control a DC motor having a first terminal and a second terminal. The automotive electronic system includes a first transistor having a gate, a source and a drain, wherein the drain is coupled to the first terminal. The automotive electronic system further includes a second transistor having a gate, a source and a drain, wherein the drain is coupled to the second terminal and the source is coupled to the source of the first transistor. The first transistor and the second transistor are operable to couple the first terminal to the second terminal, wherein the DC motor stops rotating when the first and second terminals are coupled by the first and second transistors.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these descriptions are provided so that this disclosure will satisfy applicable requirements.

Figure 1:
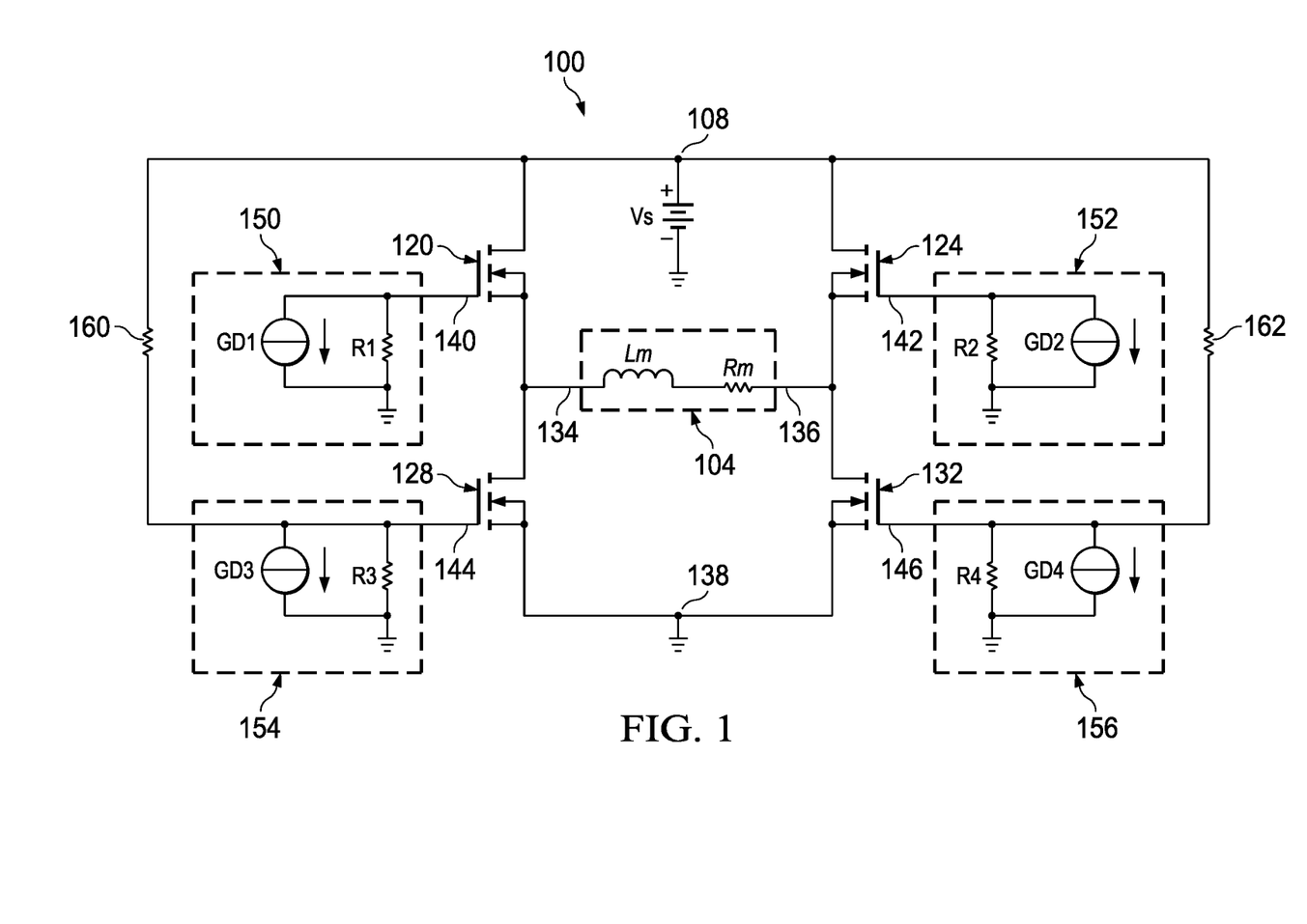
FIG. 1 is a schematic of a control circuit in accordance with an exemplary embodiment.

FIG. 1 is a schematic of a control circuit 100 (also referred to herein as a motor drive circuit) configured to provide passive braking for a DC motor 104 in accordance with an exemplary embodiment. The DC motor 104 is a rotary electrical machine that converts direct current (DC) electrical energy into mechanical energy. The DC motor 104 has a winding which can be represented by an equivalent inductance Lm and an equivalent resistance Rm connected in series between two terminals 134, 136 of the DC motor 104. A DC current flowing through the winding generates an electromagnetic field which causes rotation of a rotor of the motor. The direction and magnitude of the electromagnetic field can be varied with the direction and magnitude of the current flowing through the winding.

During normal operating condition when the control circuit 100 couples the DC motor 104 to a voltage supply $V_s$, the DC motor 104 is in a powered state and acts as a conventional motor. When the DC motor 104 is disconnected from the voltage supply $V_s$ and thus is not powered, the control circuit 100 preferably provides a very low resistance (more preferably, a short circuit) path across the two terminals 134, 136 of the DC motor 104. If the DC motor 104 is externally driven when the motor is disconnected from the voltage supply $V_s$, the DC motor 104 acts as a generator and produces a back electromotive force (EMF), resulting in a voltage across the terminals 134, 136. The short circuit path is applied across the terminals 134, 136 to brake the DC motor 104 when it acts as a generator. Thus, to brake the DC motor 104 when it is disconnected from the voltage supply $V_s$, the control circuit 100 drives the motor/generator into a short circuit if the DC motor 104 is externally driven.

With continuing reference to FIG. 1, the control circuit 100 includes first and second high-side transistors 120, 124 and first and second low-side transistors 128, 132. The first high-side transistor 120 is coupled between a voltage supply terminal 108, which can be connected to the voltage supply $V_s$, and the first terminal 134 of the DC motor 104. The second high-side transistor 124 is coupled between the voltage supply terminal 108 and the second terminal 136 of the DC motor 104. The first low-side transistor 128 is coupled between the first terminal 134 of the DC motor 104 and terminal 138, which can be connected to ground. The second low-side transistor 132 is coupled between the second terminal 136 of the DC motor 104 and terminal 138. Thus, in the exemplary embodiment of FIG. 1, the four transistors 120, 124, 128, 132 are coupled in a bridge configuration. While transistors 120, 124, 128 and 132 are shown as NMOS transistors with the source tied to the body of the transistor, other transistor configurations (such as using PMOS devices) may be used in these examples.

With continuing reference to FIG. 1, the operation of the transistors 120, 124, 128, 132 are controlled by gate drive circuits 150, 152, 154, 156, respectively. The gate drive circuit 150 is coupled between a gate terminal 140 of the high-side transistor 120 and the ground terminal 138, and the gate drive circuit 152 is coupled between a gate terminal 142 of the high-side transistor 124 and the ground terminal 138. The gate drive circuit 154 is coupled between a gate terminal 144 of the low-side transistor 128 and the ground terminal 138, and the drive circuit 156 is coupled between a gate terminal 146 of the low-side transistor 132 and the ground terminal 138. The gate drive circuit 150 comprises a resistor R1 connected in parallel with a transconductor GD1, and the gate drive circuit 152 comprises a resistor R2 connected in parallel with a transconductor GD2. The gate drive circuit 154 comprises a resistor R3 connected in parallel with a transconductor GD3, and the gate drive circuit 156 comprises a resistor R4 connected in parallel with a transconductor GD4. Preferably, as will be described in more detail below, the values of R1, R2, R3 and R4 are the same, but other configurations and resistance values may be used in the examples. The transconductors GD1, GD2, GD3 and GD4 supply a controlled current to the gates of the transistors 120, 124, 128 and 132, respectively, to control the operation of the transistors. By sinking a current into the transconductor GD1, a positive charge in the gate of the transistor 120 is depleted, causing the transistor 120 to turn OFF. By sourcing a current from the transconductor GD1, a positive charge in the gate of the transistor 120 is increased, causing the transistor 120 to turn ON. The transconductors GD2, GD3 and GD4 operate in a similar manner.

In operation, when the DC motor 104 is rotated in a first direction (e.g., clockwise), the high-side transistor 120 and the low-side transistor 132 are turned ON by the respective gate drive circuits 150 and 156, while the high-side transistor 124 and the low-side transistor 128 are turned OFF by the respective gate drive circuits 152 and 154. As a result, current flows from the voltage supply $V_s$ through the high-side transistor 120, the DC motor winding and the low-side transistor 132 to ground, causing the DC motor 104 to rotate in the first direction.

When the DC motor 104 is rotated in a second direction (e.g., counter-clockwise), the high-side transistor 124 and the low-side transistor 128 are turned ON by the respective gate drive circuits 152 and 154, while the high-side transistor 120 and the low-side transistor 132 are turned OFF by the respective gate drive circuits 150 and 156. Thus, current flows from the voltage supply $V_s$ through the high-side transistor 124, the DC motor winding and the low-side transistor 128 to ground, causing the DC motor 104 to rotate in the second direction.

According to exemplary embodiments, a first pull-up resistor 160 is coupled between the voltage supply terminal 108 and the gate terminal 144 of the first low-side transistor 128, and a second pull-up resistor 162 is coupled between the voltage supply terminal 108 and the gate terminal 146 of the second low-side transistor 132. When both the first and second high-side transistors 120, 124 are turned OFF, the DC motor 104 is disconnected from the voltage supply $V_s$. The first pull-up resistor 160 applies a low bias current to turn ON the first low-side transistor 128, and the second pull-up resistor 162 applies a low bias current to turn ON the second low-side transistor 132. When both the low-side transistors 128, 132 are turned ON, they provide a conductive path across the terminals 134, 136 of the DC motor 104.

As discussed before, if the DC motor 104 is externally driven when the motor is disconnected from the voltage supply $V_s$, the DC motor 104 acts as a generator and produces a back EMF, resulting in a voltage across the terminals 134, 136. The short circuit path is applied across the terminals 134, 136 to brake the DC motor 104 when it acts as a generator.

In an exemplary embodiment, the transistors 120, 124, 128, 132 are NMOS transistors. The first and second pull-up resistors 160, 162 are selected to turn ON the low-side transistors 128 and 132 if the voltage supply $V_s$ is greater than $V_{turn\_on}$, where $V_s$ is the voltage supply 108 and $V_{turn\_on}$ is the voltage required to turn ON the low-side transistors 128 and 132. Also, the first and second pull-up resistors 160, 162 are preferably selected to have a relatively high resistance (e.g., 125K Ohms) to limit current drawn from the voltage supply $V_s$. For example, if $V_s$=12V, pull-up resistors 160, 162 each are 250K Ohms, and R3=R4=150K Ohms, then current drawn from the voltage supply 108 is approximately 60 micro amps. Thus, the control circuit 100 provides passive braking while maintaining low current consumption. The transconductor GD3 sinks current from the pull-up resistor 160 when the low-side transistor 128 is tuned OFF. Similarly, the transconductor GD4 sinks current from the pull-up resistor 162 when the low-side transistor 132 is turned OFF. The transconductors GD3 and GD4 are turned OFF when the control circuit 100 is inactive.

Figure 2:
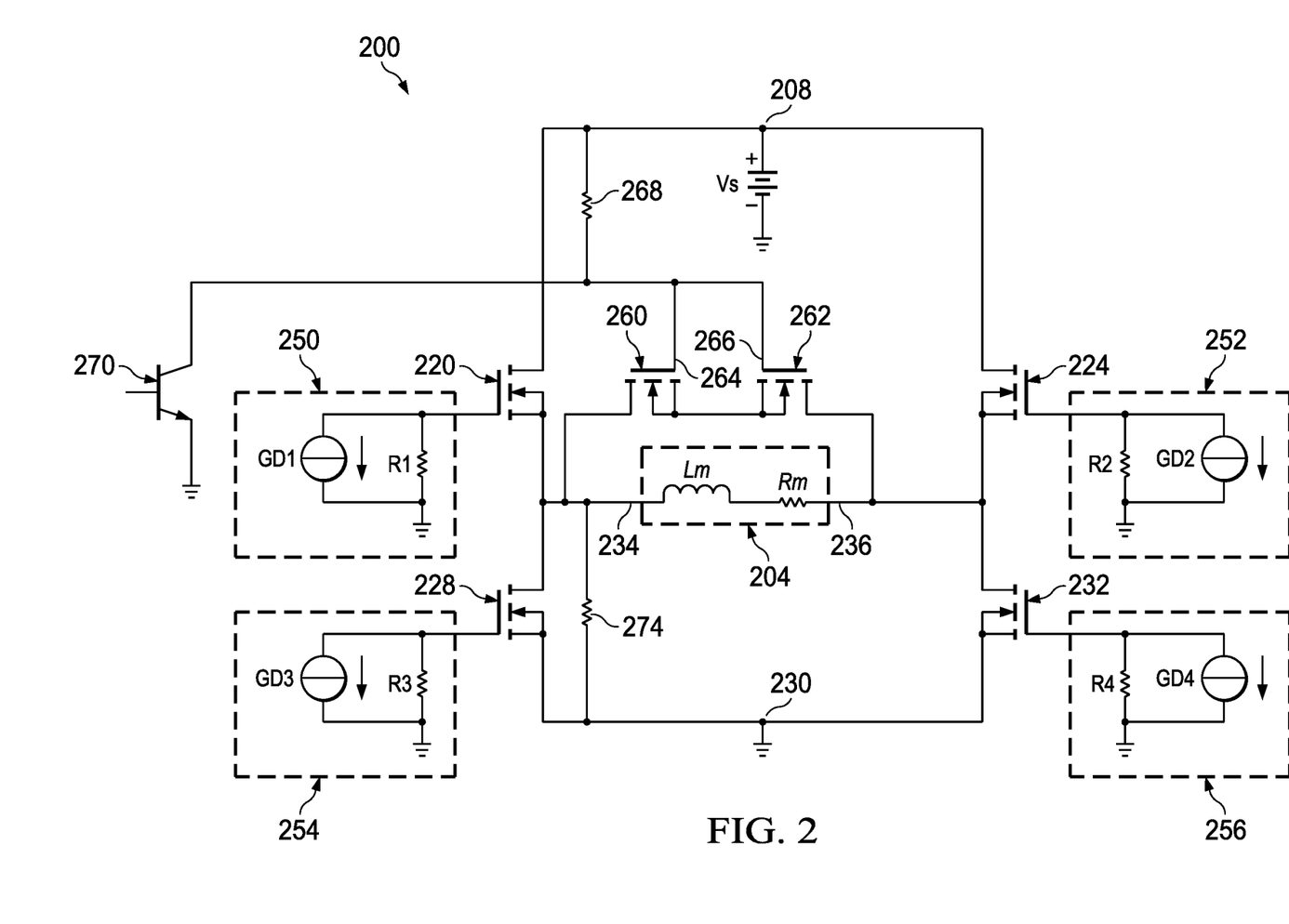
FIG. 2 is a schematic of a control circuit in accordance with another exemplary embodiment

FIG. 2 is a schematic of a control circuit 200 (also referred to as a motor drive circuit) for a DC motor 204 in accordance with another exemplary embodiment. The control circuit 200 includes first and second high-side transistors 220, 224 and first and second low-side transistors 228, 232. The first high-side transistor 220 is coupled between a voltage supply terminal 208, which can be connected to a voltage supply $V_s$, and a first terminal 234 of the DC motor 204, and the second high-side transistor 224 is coupled between the voltage supply terminal 208, which can be connected to the voltage supply $V_s$, and a second terminal 236 of the DC motor 204. The first low-side transistor 228 is coupled between the first terminal 234 of the DC motor 204 a terminal 230, which can be connected to ground, and the second low-side transistor 232 is coupled between the second terminal 236 of the DC motor 204 and the terminal 230, which can be connected to ground. Thus, in the exemplary embodiment of FIG. 2, the four transistors 220, 224, 228, 232 are coupled in a bridge configuration. The operation of the transistors 220, 224, 228, 232 are controlled by respective gate drive circuits 250, 252, 254, 256. The configurations of the gate drive circuits 250, 252, 254, 256 are similar to the configurations of the gate drive circuits of the control circuit 100 which is illustrated in FIG. 1.

With continuing reference to FIG. 2, the control circuit 200 includes fifth and sixth transistors 260, 262 coupled in series across the first and second terminals 234, 236 of the DC motor 204. A pull-up resistor 268 is coupled between the voltage supply terminal 208 and gate terminals 264, 266 of the transistors 260, 262, respectively. A seventh transistor 270 is coupled between the gate terminals 264, 266 and the ground terminal 230. A resistor 274 couples the DC motor winding to the ground terminal 230.

When the DC motor 204 is in a powered state and run as a conventional motor, the seventh transistor 270 is turned ON which pulls the gate terminals 264, 266 low, thus turning OFF the fifth and sixth transistors 260, 262. When the DC motor 204 is disconnected from the voltage supply $V_s$, the seventh transistor 270 is turned OFF, causing the gate terminals 264, 266 to be pulled up by the pull-up resistor 268. As a result, the series connected transistors 260, 262 are turned ON, providing a conductive path across the terminals 234, 236 of the DC motor 204. If the DC motor 204 is externally driven when the motor is disconnected from $V_s$, the DC motor 204 acts as a generator which produces a back EMF, resulting in a voltage across the terminals 234, 236. The short circuit path is applied across the terminals 234, 236 to brake the DC motor 204 when it acts as a generator.

In an exemplary embodiment, the high-side transistors 220, 224 and the low-side transistors 228, 232 are NMOS transistors. Also, the fifth and sixth transistors 260, 262 are NMOS transistors. The seventh transistor 270 may be an NMOS transistor or a PMOS transistor configured to turn ON/OFF the fifth and sixth transistors 260, 262. When the seventh transistor 270 is turned OFF, a voltage is applied to the gate terminals 264, 266 by the pull-up resistor 268, thus enhancing the channels of the NMOS transistors 260, 262 and turning ON the NMOS transistors 260, 262. When the seventh transistor 270 is turned ON, the gate terminals 264, 266 are pulled low, thus depleting the channels of the NMOS transistors 260, 262 and turning OFF the NMOS transistors 260, 262. In an alternative example, a single transistor may be used instead of the two series connected transistors 260 and 262 to provide a conductive path across the terminals 234, 236 of the DC motor 204.

According to embodiments of the disclosure, the resistors 268, 270 are preferably selected to have relatively high resistance values to minimize current drawn from the voltage supply $V_s$ when the DC motor 204 is disconnected from $V_s$. For example, if the voltage supply $V_s$ is 12V, and resistors 268, 274 are each 100K ohms, current flowing through the resistor 268 is effectively zero. Thus, the control circuit 200 provides passive braking while maintaining low current consumption.

Figure 3:
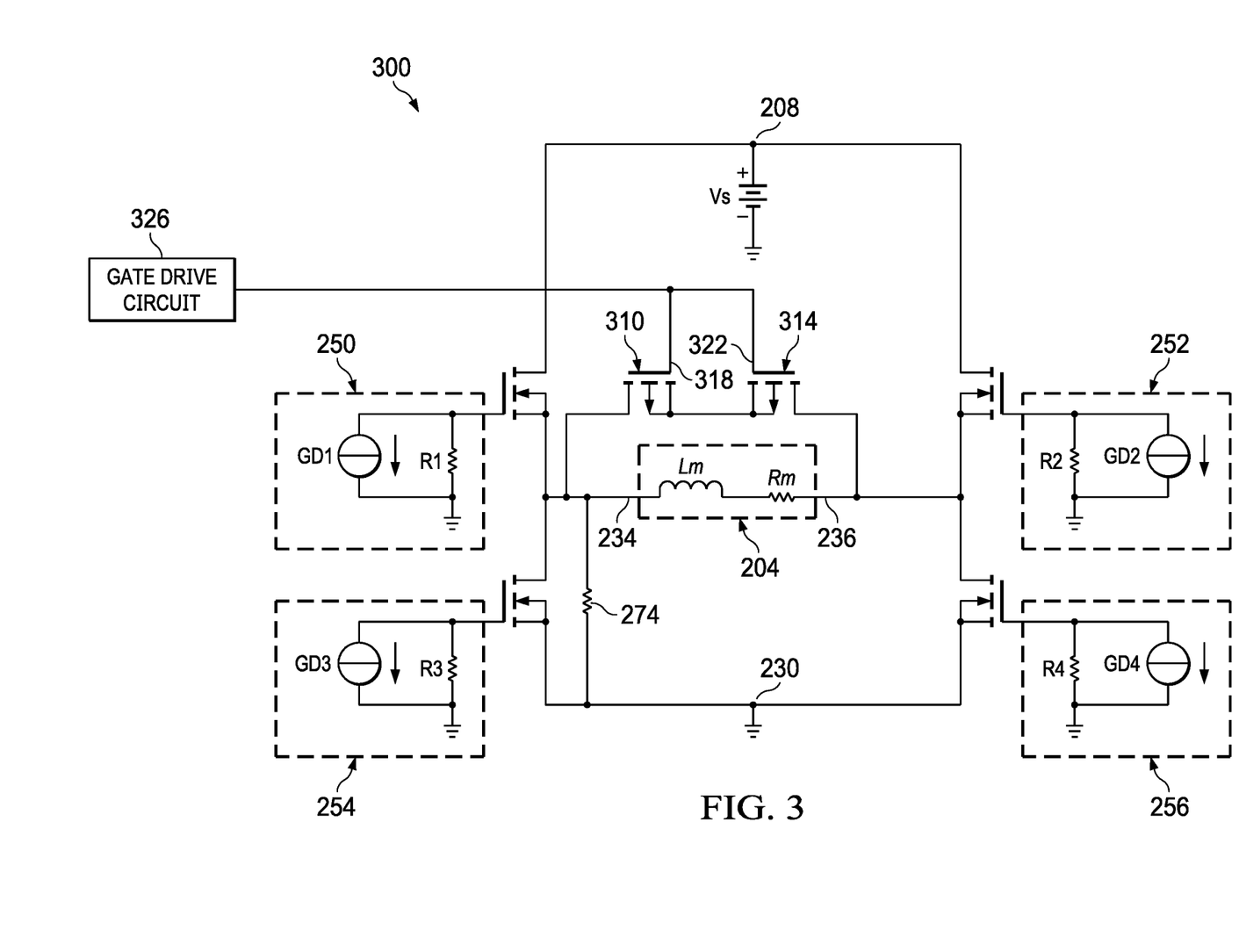
FIG. 3 is a schematic of a control circuit in accordance with yet another exemplary embodiment.

In yet another exemplary embodiment illustrated in FIG. 3, a control circuit 300 includes the first and second high-side NMOS transistors 220, 224 and the first and second low-side NMOS transistors 228, 232 configured in a bridge configuration for driving the DC motor 204. The operation of the NMOS transistors 220, 224, 228, 232 are controlled by respective the gate drive circuits 250, 252, 254, 256. The configurations of the gate drive circuits 250, 252, 254, 256 are similar to the configurations of the gate drive circuits of the control circuit 200 which is illustrated in FIG. 2.

With continuing reference to FIG. 3, the control circuit 300 includes depletion mode PMOS transistors 310, 314 coupled in series across the first and second terminals 234, 236 of the DC motor 204. The PMOS transistors 310, 314 have respective gate terminals 318, 322 that are connected to a gate drive circuit 326. In one embodiment, the gate drive circuit 326 may be a charge pump 326 configured to control the operation of the PMOS transistors 310, 314. The resistor 274 couples the DC motor winding to ground. In an alternative example, transistors 310 and 314 are NMOS transistors, and in another alternative example transistors 310 and 314 may be replaced with a single transistor.

When the DC motor 204 is in an active state, the gate drive circuit 326 applies a potential to the gate terminals 318, 322 to deplete the channels of the PMOS transistors 310, 314, thereby turning OFF the PMOS transistors 310, 314. When the DC motor 204 is disconnected from the voltage supply $V_s$, the gate drive circuit 326 ceases to apply the potential to the gate terminals 318, 322 to turn ON the series connected PMOS transistors 310, 314 to provide a conductive path across the terminals 234, 236 of the DC motor 204. If the DC motor 204 is externally driven when the motor is disconnected from $V_s$, the DC motor 204 acts as a generator which produces a back EMF, resulting in a voltage across the terminals 234, 236. The short circuit path is applied across the terminals 234, 236 to brake the DC motor 204 when it acts as a generator.

Figure 4:
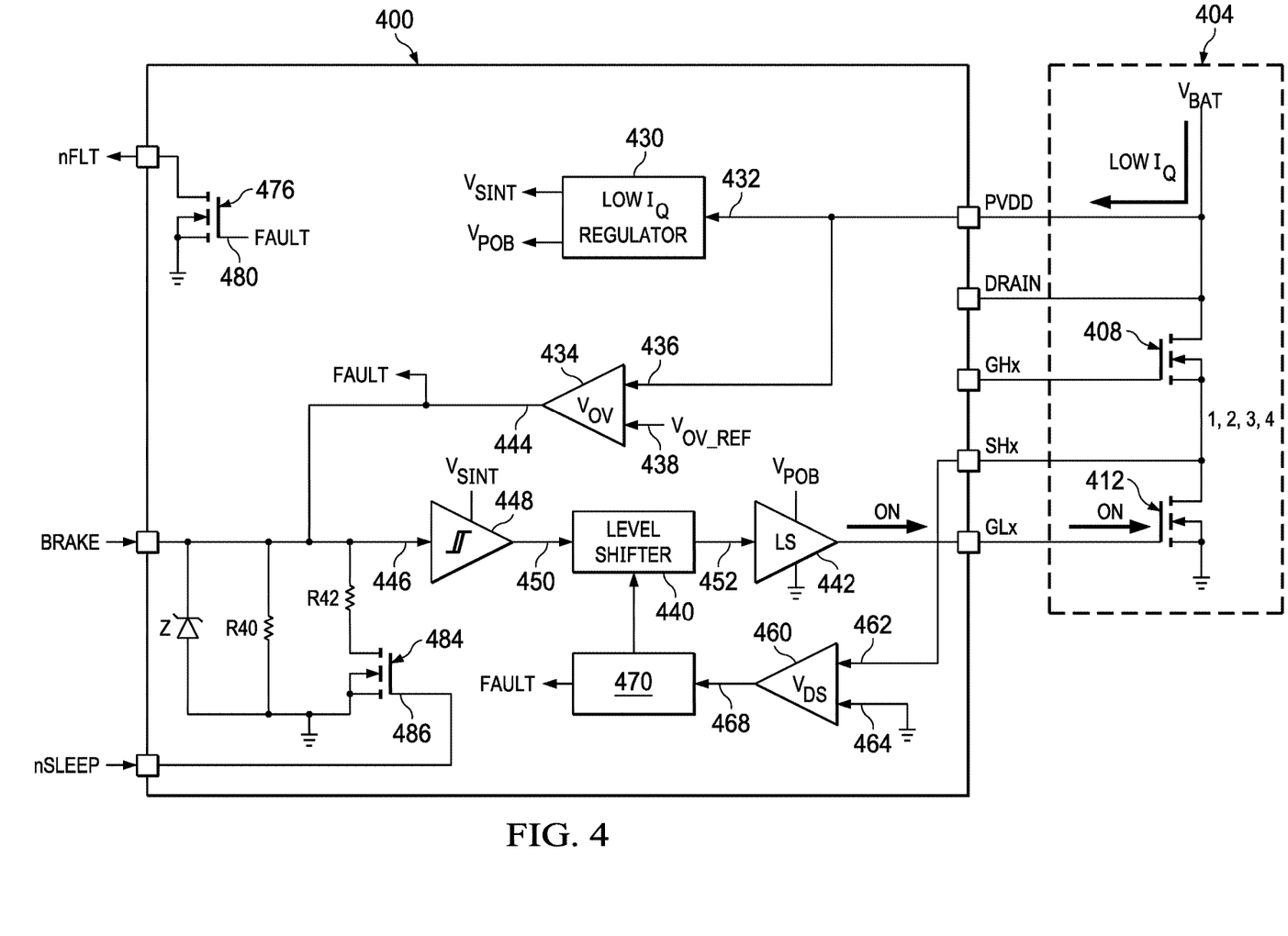
FIG. 4 illustrates a control circuit featuring over-voltage and over-current protection in accordance with an exemplary embodiment.

FIG. 4 illustrates a control circuit 400 with over-voltage and over-current protection for motor drive applications in accordance with an exemplary embodiment. In FIG. 4, the control circuit 400 is shown as being implemented as an integrated circuit (IC) configured to be coupled to a motor drive circuit such as, for example, a MOSFET bridge driver circuit. In other embodiments, the control circuit 400 can be implemented with discrete components.

With reference to FIG. 4, the control circuit 400 is shown coupled to a drive circuit 404 which may comprise a high-side transistor 408 and a low-side transistor 412 arranged in a half-bridge configuration. The control circuit 400 is connected to a battery voltage supply $V_{BAT}$ via an external pin connection PVDD. The control circuit 400 is connected to a drain terminal of the transistor 408 via an external pin connection DRAIN. The control circuit 400 is connected to a gate terminal of the transistor 408 via an external pin connection GHx. The control circuit 400 is connected to a source terminal of the transistor 412 via an external pin connection SHx. The control circuit 400 is connected to a gate terminal of the transistor 412 via an external pin connection GLx. In other embodiments, the control circuit 400 may be coupled to a drive circuit arranged in a double half-bridge, a triple half-bridge or a full-bridge configuration.

With continuing reference to FIG. 4, the control circuit 400 includes a low quiescent current (IQ) regulator 430 having an input terminal 432 coupled to a battery voltage $V_{BAT}$. The IQ regulator 430 generates $V_{SINT}$ and $V_{POB}$ voltages which are provided as voltages to a Schmitt trigger buffer 448 and a gate drive circuit 442, respectively. The control circuit 400 also includes an over-voltage detection circuit 434 having a first input terminal 436 coupled to the battery voltage supply $V_{BAT}$ and a second input terminal 438 coupled to a threshold voltage, $V_{OV\_REF}$. If the motor is externally driven but not braked, back EMF generated by the motor causes $V_{BAT}$ to rise. If $V_{BAT}$ exceeds $V_{OV\_REF}$, the over-voltage detection circuit 434 outputs an over-voltage detect signal at an output terminal 444. The over-voltage detect signal is applied to an input terminal 446 of the Schmitt trigger buffer 448.

Responsive to the over-voltage detect signal, the Schmitt trigger buffer 448 generates a gate control signal at its output terminal 450. A level shifter 440 may adjust the gate control signal which is then applied to an input terminal 452 of the gate drive circuit 442. Responsive to the gate control signal, the gate drive circuit 442 enables the low-side transistor 412, thus triggering passive braking. Alternatively, gate drive circuit 442 may output a signal to transistors 310 and 314, for example, to cause passive breaking.

With continuing reference to FIG. 4, the control circuit 400 also provides over-current protection for the low-side transistor 412. A comparator 460 is configured to sense the voltage across the drain and source terminals of the low-side transistor 412 through two input terminals 462, 464 of the comparator 460. If a short circuit is detected across the drain and source terminals of the low-side transistor 412, indicating an over-current condition, the comparator 460 outputs an over-current detect signal at its output terminal 468. The over-current detect signal is filtered by an analog filter 470 to remove transients or noise that may cause a false over-current trigger. The output of the analog filter 470 is applied to the level shifter 440 to adjust the level-shifting.

Variations to the control circuit 400 within the scope of the disclosure are possible. The control circuit 400 may include a transistor 476 to indicate a fault condition. The transistor 476 has a gate terminal 480 to which is applied the over-voltage detect signal (indicated as FAULT). Responsive to the over-voltage detect signal, the transistor 476 is turned ON, indicating a fault condition via an external pin connection nFLT. Similarly, the output of the analog filter 470 may be applied to the gate terminal 480 of the transistor 480 to turn ON the transistor 476 to indicate a fault condition.

Further variations to the control circuit 400 within the scope of the disclosure are possible. In order to reduce leakage current when the control circuit 400 is in a deep sleep state, a transistor 484 may be coupled to the input terminal 446 of the Schmitt trigger buffer 448 via a resistor, R42. A Zener diode, Z, and a resistor, R40, are coupled in parallel between the input terminal 446 and ground. When the control circuit 400 is in a deep sleep state, the transistor 484 is turned ON via an external pin connection nSLEEP, thus disabling the Schmitt trigger buffer 448. Also, passive braking can be activated directly via an external pin connection BRAKE which bypasses the over-voltage detection circuit 460. Thus, the passive braking may be triggered by an external circuit or activated by a microcontroller.

Various illustrative components, blocks, modules, circuits, and steps have been described above in general terms of their functionality. Whether such functionality is implemented as hardware or software depends upon the particular application and design constraints imposed on the overall system. The described functionality may be implemented in varying ways for each particular application, but such implementation decision should not be interpreted as causing a departure from the scope of the present disclosure.

For simplicity and clarity, the full structure and operation of all systems suitable for use with the present disclosure is not being depicted or described herein. Instead, only so much of a system as is unique to the present disclosure or necessary for an understanding of the present disclosure is depicted and described.

What is claimed is:

1. A control circuit for a DC motor having a first terminal and a second terminal, the control circuit comprising:
   a first high-side transistor coupled between a voltage supply terminal and the first terminal of the DC motor;
   a second high-side transistor coupled between the voltage supply terminal and the second terminal of the DC motor;
   a first low-side transistor coupled between a ground terminal and the first terminal of the DC motor;
   a second low-side transistor coupled between the ground terminal and the second terminal of the DC motor;
   a first pull-up resistor coupled between the voltage supply terminal and a gate terminal of the first low-side transistor;
   a second pull-up resistor coupled between the voltage supply terminal and a gate terminal of the second low-side transistor,
   wherein the first and second pull-up resistors are configured to turn ON the first and second low-side transistors to provide a conductive path across the first and second terminals to brake the DC motor.

2. The control circuit of claim 1, wherein the first high-side and the second low-side transistors are turned ON to rotate the DC motor in a clockwise direction, and wherein the second high-side and the first low-side transistors are turned ON to rotate the DC motor in a counter-clockwise direction.

3. The control circuit of claim 1, wherein the first and second high-side transistors are turned OFF when the DC motor is disconnected from a voltage supply.

4. The control circuit of claim 1, wherein the first and second low-side transistors are turned ON by the respective bias currents to provide a short circuit path across the first and second terminals of the DC motor when it is externally driven.

5. The control circuit of claim 1, wherein the first and second high-side and first and second low-side transistors are NMOS transistors.

6. The control circuit of claim 1, further comprising a first low-side transconductor coupled between the gate terminal of the first low-side transistor and the ground terminal to sink current from the first pull-up resistor when the first low-side transistor is turned OFF.

7. The control circuit of claim 1, further comprising a second low-side transconductor coupled between the gate terminal of the second low-side transistor and the ground terminal to sink current from the second pull-up resistor when the second low-side transistor is turned OFF.

8. A control circuit for a DC motor, comprising:
   first and second high-side transistors and first and second low-side transistors coupled to the DC motor in a bridge configuration, wherein the first high-side transistor and the second low-side transistor are turned ON to rotate the DC motor in a clockwise direction and the second high-side transistor and the first low-side transistor are turned ON to rotate the DC motor in a counter-clockwise direction;
   a first pull-up resistor coupled between a voltage supply terminal and a gate terminal of the first low-side transistor;
   a second pull-up resistor coupled between the voltage supply terminal and a gate terminal of the second low-side transistor,
   wherein the first and second pull-up resistors are configured to apply respective bias currents to turn ON the first and second low-side transistors to provide a conductive path across the first and second terminals of the DC motor to brake the DC motor.

9. The control circuit of claim 8, wherein the first high-side transistor is coupled between the voltage supply terminal and a first terminal of the DC motor and the second high-side transistor is coupled between the voltage supply terminal and a second terminal of the DC motor.

10. The control circuit of claim 8, wherein the first and second high-side transistors are turned OFF when the DC motor is disconnected from a voltage supply.

11. The control circuit of claim 8, wherein the first and second low-side transistors are turned ON by the respective bias currents to provide a short circuit path across the first and second terminals of the DC motor when the motor is externally driven.

12. The control circuit of claim 8, further comprising a first low-side transconductor coupled between the gate terminal of the first low-side transistor and the ground terminal to sink current from the first pull-up resistor when the first low-side transistor is turned OFF.

13. The control circuit of claim 8, further comprising a second low-side transconductor coupled between the gate terminal of the second low-side transistor and the ground terminal to sink current from the second pull-up resistor when the second low-side transistor is turned OFF.

14. The control circuit of claim 8, wherein the first and second high-side and first and second low-side transistors are NMOS transistors.

15. A control circuit for a DC motor, comprising:
a first high-side transistor coupled between a voltage supply terminal and a first terminal of the DC motor;
a second high-side transistor coupled between the voltage supply terminal and a second terminal of the DC motor;
a first low-side transistor coupled between a ground terminal and the first terminal of the DC motor;
a second low-side transistor coupled between the ground terminal and the second terminal of the DC motor;
fifth and sixth transistors coupled in series across the first and second terminals of the DC motor,
wherein the fifth and the sixth transistors are turned OFF when the DC motor is powered ON, and wherein the fifth and the sixth transistors are turned ON when the DC motor is disconnected from a voltage supply to provide a conductive path across the first and second terminals of the DC motor to brake the DC motor.

16. The control circuit of claim 15, further comprising a seventh transistor coupled to the fifth and sixth transistors to turn OFF the fifth and sixth transistors when the DC motor is powered ON and configured to turn ON the fifth and sixth transistors when the DC motor is disconnected from the voltage supply.

17. The control circuit of claim 16, wherein the seventh transistor is turned ON to couple the gate terminals of the fifth and sixth transistors to the ground terminal to turn OFF the fifth and sixth transistors.

18. The control circuit of claim 15, further comprising a first pull-up resistor coupled between the voltage supply terminal and the gate terminals of the fifth and sixth transistors, the first pull-up resistor configured to turn ON the fifth and sixth transistors when the seventh transistor is turned OFF.

19. The control circuit of claim 15, wherein the first and second high-side transistors are turned OFF when the DC motor is disconnected from the voltage supply.

20. The control circuit of claim 15, wherein the first and second high-side and first and second low-side transistors are NMOS transistors.

21. The control circuit of claim 15, wherein the fifth and sixth transistors are NMOS transistors.

22. The control circuit of claim 15, wherein the fifth and sixth transistors are PMOS transistors.

23. The driver circuit of claim 15, further comprising a first pull-down resistor coupled between the ground terminal and the first terminal of the DC motor.

24. A control circuit for a DC motor, comprising:
first and second high-side transistors and first and second low-side transistors coupled to the DC motor in a bridge configuration, wherein the first high-side transistor and the second low-side transistor are turned ON to rotate the DC motor in a clockwise direction and the second high-side transistor and the first low-side transistor are turned ON to rotate the DC motor in a counter-clockwise direction;
fifth and sixth transistors coupled in series across first and second terminals of the DC motor, wherein the fifth and the sixth transistors are turned OFF when the DC motor is powered ON, and wherein the fifth and the sixth transistors are turned ON when the DC motor is disconnected from a voltage supply to provide a conductive path across the first and second terminals of the DC motor to brake the DC motor.

25. The control circuit of claim 24, further comprising a seventh transistor coupled to the fifth and sixth transistors to turn OFF the fifth and sixth transistors when the DC motor is powered ON and configured to turn ON the fifth and sixth transistors when the DC motor is disconnected from the voltage supply.

26. The control circuit of claim 24, further comprising a first pull-up resistor coupled between the voltage supply terminal and the gate terminals of the fifth and sixth transistors, the first pull-up resistor configured to turn ON the fifth and sixth transistors when the seventh transistor is turned OFF.

27. A control circuit, comprising:
a first high-side NMOS transistor coupled between a voltage supply terminal and a first terminal of a DC motor;
a second high-side NMOS transistor coupled between the voltage supply terminal and a second terminal of the DC motor;
a first low-side NMOS transistor coupled between a ground terminal and the first terminal of the DC motor;
a second low-side NMOS transistor coupled between a ground terminal and the second terminal of the DC motor;
first and second PMOS transistors coupled in series across the first and second terminals of the DC motor;
a charge pump coupled to gate terminals of the fifth and sixth PMOS transistors; and
a pull-down resistor coupled between the first terminal of the DC motor and the ground terminal;
wherein when the DC motor is powered ON, the charge pump applies a charge to the gate terminals of the PMOS transistors to turn OFF the PMOS transistors, and wherein when the DC motor is disconnected from a voltage supply, the PMOS transistors are turned ON to provide a conductive path across the terminals of the DC motor.

28. The control circuit of claim 27, wherein the first and second PMOS transistors are turned ON to brake the DC motor.

29. An automotive electronic system that is operable to control a DC motor having a first terminal and a second terminal, the automotive electronic system comprising:
a first transistor having a gate, a source and a drain, the drain is coupled to the first terminal;
a second transistor having a gate, a source and a drain, the drain is coupled to the second terminal and the source is coupled to the source of the first transistor; and
wherein the first transistor and the second transistor are operable to couple the first terminal to the second terminal.

30. The automotive electronic system of claim 29, wherein the DC motor stops rotating when the first and second terminals are coupled by the first and second transistors.

* * * * *